US012785144B2

(12) United States Patent
Kim et al.

(10) Patent No.: US 12,785,144 B2
(45) Date of Patent: Nov. 3, 2026

(54) NON-AQUEOUS ELECTROLYTE SOLUTION ADDITIVE FOR LITHIUM SECONDARY BATTERY, AND NON-AQUEOUS ELECTROLYTE SOLUTION FOR LITHIUM SECONDARY BATTERY AND LITHIUM SECONDARY BATTERY WHICH INCLUDE THE SAME

(71) Applicant: LG Energy Solution, Ltd., Seoul (KR)

(72) Inventors: Hyun Seung Kim, Daejeon (KR); Chul Haeng Lee, Daejeon (KR); Jeong Woo Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 949 days.

(21) Appl. No.: 17/772,261

(22) PCT Filed: Jun. 15, 2021

(86) PCT No.: PCT/KR2021/007462
§ 371 (c)(1),
(2) Date: Apr. 27, 2022

(87) PCT Pub. No.: WO2021/256825
PCT Pub. Date: Dec. 23, 2021

(65) Prior Publication Data

US 2022/0393241 A1 Dec. 8, 2022

(30) Foreign Application Priority Data

Jun. 15, 2020 (KR) ........................ 10-2020-0072107
Jun. 14, 2021 (KR) ........................ 10-2021-0076929

(51) Int. Cl.
*H01M 10/0567* (2010.01)
*H01M 10/0525* (2010.01)
*H01M 10/0569* (2010.01)

(52) U.S. Cl.
CPC .................. *H01M 10/0567* (2013.01); *H01M 10/0525* (2013.01); *H01M 10/0569* (2013.01)

(58) Field of Classification Search
None
See application file for complete search history.

(56) References Cited

U.S. PATENT DOCUMENTS

| | | | | |
|---|---|---|---|---|
| 4,882,244 A * | 11/1989 | Donahue | H01M 10/0568 | 429/339 |
| 2004/0185347 A1* | 9/2004 | Kim | H01M 10/0568 | 429/340 |

(Continued)

FOREIGN PATENT DOCUMENTS

| | | | |
|---|---|---|---|
| CN | 1531134 A * | 9/2004 | H01M 10/052 |
| CN | 101853963 A | 10/2010 | |

(Continued)

OTHER PUBLICATIONS

International Search Report for PCT/KR2021/007462 dated Septembr 27, 2021. 3 pgs.

(Continued)

*Primary Examiner* — Jeffrey T Barton
*Assistant Examiner* — Karen J. Armstrong
(74) *Attorney, Agent, or Firm* — Lerner David LLP

(57) ABSTRACT

A non-aqueous electrolyte solution additive and a non-aqueous electrolyte solution for a lithium secondary battery and a lithium secondary battery which include the same are disclosed herein. In some embodiments, a non-aqueous electrolyte solution may include a lithium salt, an organic solvent, and the non-aqueous electrolyte solution additive which is a compound represented by Formula 1:

(Continued)

[Formula 1]

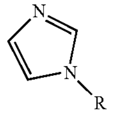

In Formula 1, R is a cyclic alkyl group having 3 to 10 carbon atoms. The non-aqueous electrolyte solution may scavenge a by-product generated by decomposition of a lithium salt using a Lewis base-based compound to suppress dissolution of transition metal from a positive electrode.

8 Claims, 1 Drawing Sheet

(56) References Cited

U.S. PATENT DOCUMENTS

2005/0064294 A1 3/2005 Lim et al.
2007/0269710 A1* 11/2007 Hirano ................ H01M 10/056 252/62.2
2012/0082903 A1* 4/2012 Zhang ................ C07F 9/65515 429/328
2013/0196206 A1 8/2013 Park et al.
2015/0288031 A1 10/2015 Zhang et al.
2020/0251777 A1 8/2020 Lim et al.
2022/0376303 A1 11/2022 Lim et al.

FOREIGN PATENT DOCUMENTS

CN 103012275 A 4/2013
CN 106252649 A 12/2016
CN 107522661 A 12/2017
CN 109818064 A 5/2019
CN 110998956 A 4/2020
EP 3432388 A1 1/2019
JP 2002260729 A 9/2002
JP 2015138627 A 7/2015
JP 2015162398 A 9/2015
KR 20040080775 A 9/2004
KR 20050029778 A 3/2005
KR 20130088481 A 8/2013
KR 101912538 B1 12/2018
KR 20190059256 A 5/2019

OTHER PUBLICATIONS

Regina Martinez: "Isoprene as Lithiation Mediator: Synthesis of 2-Substituted 1-Alkylimidazole Derivatives", Synthesis, vol. 44, No. 16, Jul. 2, 2012 (Jul. 2, 2012), pp. 2630-2638, XP093157424.
Extended European Search Report including Written Opinion for Application No. 21825916.6 dated May 17, 2024. 6 pgs.

* cited by examiner

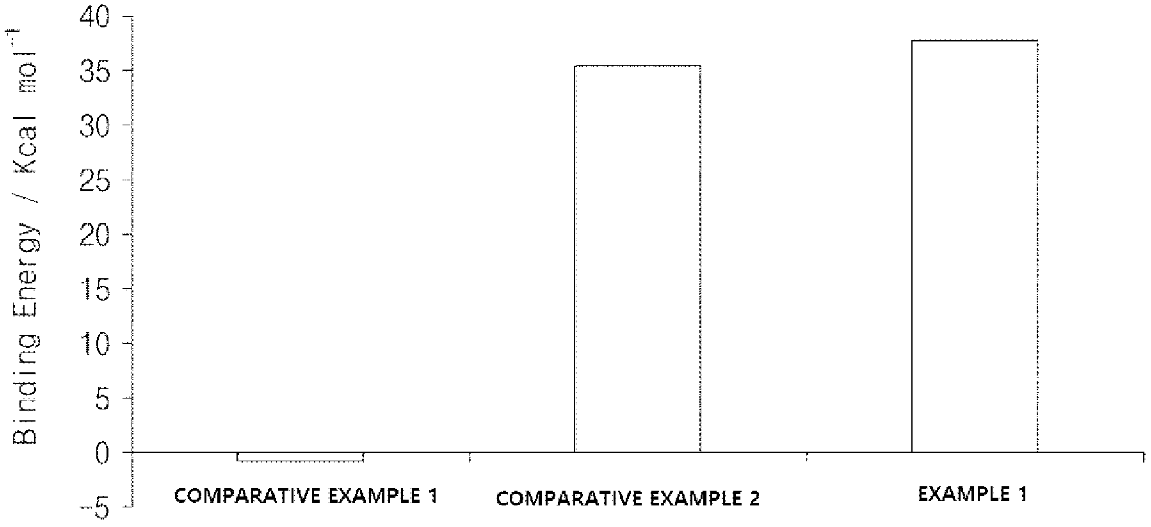
Binding Energy / Kcal mol$^{-1}$
40
35
30
25
20
15
10
5
0
-5
COMPARATIVE EXAMPLE 1
COMPARATIVE EXAMPLE 2
EXAMPLE 1

NON-AQUEOUS ELECTROLYTE SOLUTION ADDITIVE FOR LITHIUM SECONDARY BATTERY, AND NON-AQUEOUS ELECTROLYTE SOLUTION FOR LITHIUM SECONDARY BATTERY AND LITHIUM SECONDARY BATTERY WHICH INCLUDE THE SAME

CROSS-REFERENCE TO RELATED APPLICATIONS

This application is a national phase entry under 35 U.S.C. § 371 of International Application No. PCT/KR2021/007462, filed on Jun. 15, 2021, which claims priority from Korean Patent Application Nos. 10-2020-0072107, filed on Jun. 15, 2020, and 10-2021-0076929, filed on Jun. 14, 2021, the disclosures of which are incorporated by reference herein.

TECHNICAL FIELD

The present invention relates to a non-aqueous electrolyte solution additive for a lithium secondary battery, which has an excellent effect of scavenging a decomposition product generated from a lithium salt, and a non-aqueous electrolyte solution for a lithium secondary battery and a lithium secondary battery in which high-temperature durability is improved by including the same.

BACKGROUND ART

There is a need to develop technology for efficiently storing and utilizing electrical energy as personal IT devices and computer networks are developed with the development of information society and the accompanying dependency of society as a whole on the electrical energy is increased.

Among the technologies developed for this purpose, a technology based on secondary batteries is the most suitable technology for various applications. Since a secondary battery may be miniaturized to be applicable to a personal IT device and may be applied to an electric vehicle and a power storage device, there emerges an interest in the secondary battery.

Lithium ion batteries are in the spotlight as battery systems having the theoretically highest energy density among these secondary battery technologies, and are currently being used in various devices.

The lithium ion battery is composed of a positive electrode formed of a transition metal oxide containing lithium, a negative electrode formed of a carbon-based material, such as graphite, capable of storing lithium, an electrolyte solution that becomes a medium for transferring lithium ions, and a separator, and proper selection of these components is important to improve electrochemical properties of the battery.

The lithium ion battery is disadvantageous in that an increase in resistance and a decrease in capacity during charge and discharge or storage at high temperatures occur to degrade performance. One of causes of this problem is a side reaction that occurs due to degradation of the electrolyte solution at a high temperature, especially degradation due to decomposition of a lithium salt.

Particularly, with respect to $LiPF_6$ mainly used as the lithium salt, since $PF_6^-$, an anion, is very vulnerable to heat, it is known that the $LiPF_6$ generates a Lewis acid material, such as $PF_5$, while being thermally decomposed when the battery is exposed to high temperatures.

The Lewis acid material degrades a film formed on surfaces of the positive electrode/the negative electrode or an electrode surface structure to cause a solid electrolyte interphase (SEI) reductively decomposed on the surface of the negative electrode and dissolution of transition metal ions from the degraded surface of the positive electrode. The transition metal ions thus dissolved are re-deposited on the positive electrode to increase resistance of the positive electrode and cause loss of redox centers to reduce capacity of the secondary battery. In addition, since passivation ability of the SEI formed on the surface of the negative electrode decreases when the dissolved metal ions are electrodeposited on the negative electrode, irreversible capacity is increased while electrolyte decomposition for regeneration of the SEI and additional consumption of electrons and lithium ions are caused, and thus, cell capacity may be reduced and self-discharge of the negative electrode may be caused.

Therefore, research and development of various methods, which may maintain the passivation ability of the SEI when exposed to heat and may remove a cause of degradation of the battery at high temperatures by scavenging a by-product generated due to the decomposition of the lithium salt, are being attempted.

DISCLOSURE OF THE INVENTION

Technical Problem

An aspect of the present invention provides a non-aqueous electrolyte solution additive for a lithium secondary battery which may scavenge a decomposition product generated from a lithium salt in an electrolyte solution.

Another aspect of the present invention provides a non-aqueous electrolyte solution for a lithium secondary battery which includes the non-aqueous electrolyte solution additive.

Another aspect of the present invention provides a lithium secondary battery including the non-aqueous electrolyte solution for a lithium secondary battery.

Technical Solution

According to an aspect of the present invention, there is provided a non-aqueous electrolyte solution additive for a lithium secondary battery which is a compound represented by Formula 1 below:

[Formula 1]

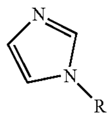

In Formula 1,

R is a cyclic alkyl group having 3 to 10 carbon atoms.

According to another aspect of the present invention, there is provided a non-aqueous electrolyte solution for a lithium secondary battery which includes a lithium salt, a non-aqueous organic solvent, and the non-aqueous electrolyte solution additive for a lithium secondary battery.

According to another aspect of the present invention, there is provided a lithium secondary battery including the non-aqueous electrolyte solution for a lithium secondary battery.

Advantageous Effects

Since a compound represented by Formula 1, which is used as a non-aqueous electrolyte solution additive for a lithium secondary battery of the present invention, as a Lewis base material, includes a nitrogen element having an unshared electron pair, it may not only easily bond with a Lewis acid, but may also localize a charge through a cyclohexane functional group, and thus, it may effectively scavenge a decomposition product of a lithium salt in an electrolyte solution.

If the non-aqueous electrolyte solution for a lithium secondary battery, which includes the non-aqueous electrolyte solution additive for a lithium secondary battery, is used, a lithium secondary battery having improved cycle performance may be achieved by easily scavenging $PF_5$ generated due to decomposition of $LiPF_6$ which is caused by high temperature or moisture in the non-aqueous electrolyte solution.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

The FIGURE is a graph illustrating the results of evaluating binding energy according to Experimental Example 1.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

With respect to a lithium secondary battery, high-temperature storage characteristics are improved because a film having passivation ability is formed on surfaces of a negative electrode and a positive electrode while a non-aqueous electrolyte solution is decomposed during initial charge and discharge. However, the film may be degraded by acids, such as HF and $PF_5$, which are produced by pyrolysis of a lithium salt ($LiPF_6$, etc.) widely used in a lithium ion battery. Also, surface resistance of the electrode is increased due to a change in structure of the surface while dissolution of transition metal elements occurs from the positive electrode due to the attack of these acids, and theoretical capacity and apparent capacity may be reduced as the metal elements, which are redox centers, are lost. Furthermore, since transition metal ions thus dissolved are electrodeposited on the negative electrode reacting in a strong reduction potential range to not only consume electrons but also to destruct the film, electrolyte decomposition for regeneration of a solid electrolyte interphase (SEI) and additional consumption of electrons and lithium ions are caused. As a result, there is a limitation in that resistance of the negative electrode increases and capacity of a cell is continuously reduced as irreversible capacity is increased.

Thus, the present invention aims at providing a non-aqueous electrolyte solution, which may scavenge the acid caused by the decomposition of the lithium salt and may prevent the dissolution of the transition metal from the positive electrode or the degradation of the SEI during high-temperature storage by including a Lewis base-based compound capable of forming the SEI as a non-aqueous electrolyte solution additive component, and a lithium secondary battery including the same.

Non-aqueous Electrolyte Solution Additive for Lithium Secondary Battery

According to an embodiment, the present invention provides a non-aqueous electrolyte solution additive which is a compound represented by the following Formula 1:

[Formula 1]

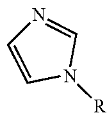

In Formula 1,

R is a cyclic alkyl group having 3 to 10 carbon atoms.

The compound represented by Formula 1, which is used as the electrolyte solution additive, is a Lewis base-based material, wherein, since it includes both a cyclic alkyl group and a nitrogen element having an unshared electron pair in one molecular structure, an electron withdrawing inductive effect by an imidazole functional group is low in comparison to a compound represented by the following Formula 2 containing a benzyl group. Thus, binding energy with a Lewis acid may be increased by localizing a charge toward the imidazole functional group in the compound structure, and accordingly, a decomposition product of the lithium salt may be effectively scavenged in the electrolyte solution.

[Formula 2]

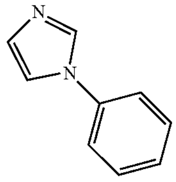

That is, since the compound represented by Formula 1 has an excellent binding force with a Lewis acid material as illustrated in Reaction Equation 1 below, it may effectively scavenge a Lewis acid such as HF or $PF_5$. Thus, the compound represented by Formula 1 may suppress the dissolution of the transition metal from the positive electrode which is caused by the Lewis acid and may suppress a degradation behavior due to a chemical reaction of the film on the surface of the positive electrode/negative electrode. Also, since the compound represented by Formula 1 may suppress a degradation behavior by suppressing damage of the film on the surface of the negative electrode, it may prevent additional decomposition of the electrolyte solution of the battery due to destruction of the film, and, furthermore, it may improve high-temperature storage characteristics by alleviating self-discharge of the secondary battery.

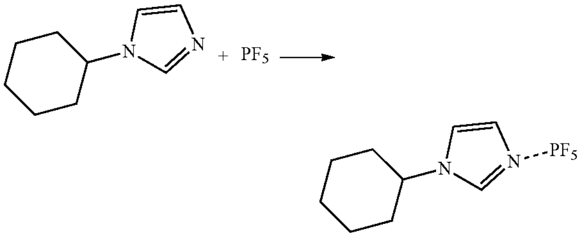

Specifically, in Formula 1, R may be a cyclic alkyl group having 5 to 8 carbon atoms, R may be more specifically a cyclic alkyl group having 5 to 7 carbon atoms, and, when R is within the above range, a delocalization effect on the charge of the above-described compound may be reduced.

More specifically, the compound represented by Formula 1 may be a compound represented by Formula 1a below.

[Formula 1a]

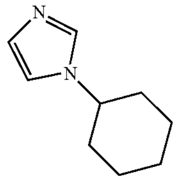

Non-aqueous Electrolyte Solution for Lithium Secondary Battery

According to another embodiment, the present invention provides a non-aqueous electrolyte solution for a lithium secondary battery which includes a lithium salt; an organic solvent; and the above-described non-aqueous electrolyte solution additive for a lithium secondary battery.

(1) Lithium Salt

First, the lithium salt will be described as follows.

In the non-aqueous electrolyte solution for a lithium secondary battery according to the embodiment of the present invention, any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3$, $(CF_3)_4PF_2^-$, $(CF_3)_5PF^-$, $(CF_3)_6P^-$, $CF_3SO_3$, $C_4F_9SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $CH_3SO_3$, $CF_3(CF_2)_7SO_3$, $CF_3CO_2^-$, $CH_3CO_2^-$, $SCN^-$, and $(CF_3CF_2SO_2)_2N^-$ as an anion. Specifically, the lithium salt may include at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, $LiBOB(LiB(C_2O_4)_2)$, $LiCF_3SO_3$, LiTFSI $(LiN(SO_2CF_3)_2)$, LiFSI $(LiN(SO_2F)_2)$, $LiCH_3SO_3$, $LiCF_3CO_2$, $LiCH_3CO_2$, and LiBETI $(LiN(SO_2CF_2CF_3)_2)$. The lithium salt may specifically include a single material selected from the group consisting of $LiBF_4$, $LiClO_4$, $LiPF_6$, $LiBOB(LiB(C_2O_4)_2)$, $LiCF_3SO_3$, LiTFSI $(LiN(SO_2CF_3)_2)$, LiFSI$(LiN(SO_2F)_2)$, and LiBETI $(LiN(SO_2CF_2CF_3)_2)$ or a mixture of two or more thereof, and may more specifically include $LiPF_6$.

The lithium salt may be appropriately changed in a normally usable range, but may be included in a concentration of 0.8 M to 3.0 M, for example, 1.0 M to 3.0 M in the electrolyte solution to obtain an optimum effect of forming a film for preventing corrosion of the surface of the electrode.

In a case in which the concentration of the lithium salt satisfies the above range, viscosity of the non-aqueous electrolyte solution may be controlled so that optimum impregnability may be achieved, and an effect of improving capacity characteristics and cycle characteristics of the lithium secondary battery may be obtained by improving mobility of lithium ions.

(2) Organic Solvent

Also, an organic solvent will be described as follows.

The organic solvent may include a cyclic carbonate-based organic solvent, a linear carbonate-based organic solvent, or a mixed organic solvent thereof.

The cyclic carbonate-based organic solvent is an organic solvent which may well dissociate the lithium salt in a non-aqueous electrolyte solution due to high permittivity as a highly viscous organic solvent, wherein specific examples thereof may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein typical examples thereof may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

In order to prepare an electrolyte solution having high ionic conductivity, it is desirable to use a mixed organic solvent of the cyclic carbonate-based organic solvent and the linear carbonate-based organic solvent. The cyclic carbonate-based organic solvent and the linear carbonate-based organic solvent may be used by being mixed in a volume ratio of 1:9 to 5:5, for example, 2:8 to 4:6.

Furthermore, the organic solvent may further include a linear ester-based organic solvent and/or a cyclic ester-based organic solvent in addition to the cyclic carbonate-based organic solvent and/or the linear carbonate-based organic solvent.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

Furthermore, the organic solvent may further include at least one organic solvent selected from an ether-based organic solvent, an amide-based organic solvent, and a nitrile-based organic solvent.

Any one selected from the group consisting of dimethyl ether, diethyl ether, dipropyl ether, methylethyl ether, methylpropyl ether, and ethylpropyl ether or a mixture of two or more thereof may be used as the ether-based solvent.

The nitrile-based solvent may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

(3) Electrolyte Solution Additive

The non-aqueous electrolyte solution for a lithium secondary battery of the present invention includes the above-described non-aqueous electrolyte solution additive for a lithium secondary battery, and the non-aqueous electrolyte solution additive for a lithium secondary battery is the compound represented by Formula 1.

In this case, since descriptions of the compound represented by Formula 1 overlap with those described above, the descriptions thereof will be omitted.

The compound represented by Formula 1 may be included in the non-aqueous electrolyte solution in an amount of 0.05 wt % to 6.5 wt % based on a total weight of the non-aqueous electrolyte solution in consideration of an effect of forming a stable film on the surface of the electrode and an effect of scavenging a thermal decomposition product of the lithium salt.

In a case in which the amount of the compound represented by Formula 1 satisfies the above range, since a robust film is formed on the surface of the positive electrode while suppressing disadvantages, such as a side reaction due to the additive, a decrease in capacity, and an increase in resistance, as much as possible, the dissolution of the transition metal of a positive electrode active material at high temperatures may be effectively suppressed and excellent high-temperature durability may be achieved by effectively scavenging the thermal decomposition product of the lithium salt.

The compound represented by Formula 1 may be particularly included in an amount of 0.05 wt % to 5.5 wt %, more particularly 0.1 wt % to 3.5 wt %, for example, 0.2 wt % to 2.5 wt % in the non-aqueous electrolyte solution, and, in a case in which the amount of the compound represented by Formula 1 is 0.05 wt % or more, the effect of scavenging the thermal decomposition product of the lithium salt, such as HF or $PF_5$, and the effect of suppressing the dissolution of the transition metal by protection of the positive electrode may be more stably maintained during battery operating time. Also, in a case in which the amount of the compound represented by Formula 1 is 5.5 wt % or less, the viscosity of the non-aqueous electrolyte solution may be controlled so that the optimum impregnability may be achieved, an increase in battery resistance due to the decomposition of the additive may be effectively suppressed, and degradation of rate capability or low-temperature life characteristics during high-temperature storage may be prevented by further increasing ionic conductivity in the battery.

(4) Other Additives

The non-aqueous electrolyte solution of the present invention may further include other additional additives in addition to the compound represented by Formula 1, if necessary, in order to prevent the occurrence of the collapse of the negative electrode due to the decomposition of the non-aqueous electrolyte solution in a high power environment or to further improve low-temperature high rate discharge characteristics, high-temperature stability, overcharge prevention, and an effect of suppressing battery swelling at high temperature.

Examples of the other additive may be at least one selected from the group consisting of a cyclic carbonate-based compound, a halogen-substituted carbonate-based compound, a sultone-based compound, a sulfate-based compound, a phosphate-based or phosphite-based compound, a borate-based compound, a nitrile-based compound, a benzene-based compound, an amine-based compound, a silane-based compound, and a lithium salt-based compound.

The cyclic carbonate-based compound, for example, may be vinylene carbonate (VC) or vinyl ethylene carbonate.

The halogen-substituted carbonate-based compound, for example, may be fluoroethylene carbonate (FEC).

The sultone-based compound, for example, may be at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may be ethylene sulfate (Esa), trimethylene sulfate (TMS), or methyl trimethylene sulfate (MTMS).

The phosphate-based or phosphite-based compound, for example, may be at least one compound selected from the group consisting of lithium difluoro bis(oxalato)phosphate, lithium difluorophosphate, tris(trimethylsilyl)phosphate, tris(trimethylsilyl)phosphite, tris(2,2,2-trifluoroethyl)phosphate, and tris(trifluoroethyl)phosphite.

The borate-based compound may include tetraphenylborate, lithium oxalyldifluoroborate (LiODFB), or lithium bis(oxalato) borate ($LiB(C_2O_4)_2$, LiBOB).

The nitrile-based compound, for example, may be at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound, for example, may be fluorobenzene, the amine-based compound may be triethanolamine or ethylenediamine, and the silane-based compound may be tetravinylsilane.

The lithium salt-based compound is a compound different from the lithium salt included in the non-aqueous electrolyte solution, wherein the lithium salt-based compound may include $LiPO_2F_2$ or $LiBF_4$.

In a case in which, among these additional additives, vinylene carbonate, vinyl ethylene carbonate, or succinonitrile is included, a more robust SEI may be formed on the surface of the negative electrode during an initial activation process of the secondary battery. Also, in a case in which the $LiBF_4$ is included, high-temperature stability of the secondary battery may be improved by suppressing generation of a gas which may be generated due to the decomposition of the electrolyte solution during high-temperature storage.

Two or more compounds may be mixed and used as the other additives, and a total amount of the compound represented by Formula 1 and the other additives included may be in a range of 50 wt % or less, particularly 0.05 wt % to 20 wt %, and more particularly 0.05 wt % to 10 wt % based on the total weight of the non-aqueous electrolyte solution. In a case in which the total amount of the additives satisfies the above range, low-temperature output characteristics of the battery may be improved, high-temperature storage characteristics and high-temperature life characteristics may be more effectively improved, and occurrence of the side reaction of the battery due to the additives remaining after the reaction may be prevented.

Lithium Secondary Battery

Also, in another embodiment of the present invention, there is provided a lithium secondary battery including the non-aqueous electrolyte solution for a lithium secondary battery of the present invention.

Specifically, the lithium secondary battery may include a positive electrode, a negative electrode, and the above-described non-aqueous electrolyte solution for a lithium secondary battery. More specifically, the lithium secondary battery may include a positive electrode, a negative electrode, a separator disposed between the positive electrode and the negative electrode, and the above-described non-aqueous electrolyte solution for a lithium secondary battery.

After an electrode assembly, in which the positive electrode, the separator, and the negative electrode are sequentially stacked, is formed and accommodated in a battery case, the lithium secondary battery of the present invention may be prepared by injecting the non-aqueous electrolyte solution of the present invention.

The lithium secondary battery of the present invention may be prepared according to a conventional method known in the art and used, and a method of preparing the lithium secondary battery of the present invention is specifically the same as that described later.

(1) Positive Electrode

The positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may include a lithium transition metal oxide including lithium and at least one metal selected from cobalt, manganese, nickel, or aluminum, and may specifically include at least one selected from lithium-manganese-based oxide with high stability and capacity characteristics of the battery, lithium iron phosphate, and lithium-nickel-manganese-cobalt-based oxide (e.g., $Li(Ni_pCo_qMn_{r1})O_2$ (where 0<p<1, 0<q<1, 0<r1<1, and p+q+r1=1).

Specifically, the lithium-manganese-based oxide may include $LiMnO_2$ or $LiMn_2O_4$, and the lithium iron phosphate may, for example, include $LiFePO_4$.

Also, the lithium-nickel-manganese-cobalt-based oxide may include at least one selected from $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.15})O_2$), wherein, among them, it is desirable that the lithium-nickel-manganese-cobalt-based oxide includes a lithium transition metal oxide in which an amount of nickel among transition metals is 60 atm % or more. That is, since the higher the amount of the nickel among the transition metals is the higher the capacity may be achieved, it is more advantageous in using the lithium transition metal oxide having a nickel content of 60 atm % or more to achieve high capacity. The lithium transition metal oxide may include at least one selected from the group consisting of $Li(Ni_{0.6}Mn_{0.2}Co_{0.2})O_2$, $Li(Ni_{0.7}Mn_{0.15}Co_{0.15})O_2$, and $Li(Ni_{0.8}Mn_{0.1}Co_{0.1})O_2$.

In addition to the above lithium transition metal oxide, the positive electrode active material of the present invention may further include lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2)), lithium-nickel-cobalt-based oxide (e.g., $LiNi_{1-Y}Co_{Y1}O_2$ (where 0<Y1<1)), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2)), lithium-nickel-manganese-cobalt-based oxide (e.g., $Li(Ni_{p1}Co_{q1}Mn_{r2})O_4$ (where 0<p1<2, 0<q1<2, 0<r2<2, and p1+q1+r2=2)), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), and any one thereof or a compound of two or more thereof may be further included.

The positive electrode active material may be included in an amount of 80 wt % to 99 wt %, for example, 90 wt % to 99 wt % based on a total weight of solid content in the positive electrode slurry. In this case, when the amount of the positive electrode active material is 80 wt % or less, since energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be a fluorine resin-based binder including polyvinylidene fluoride (PVDF) or polytetrafluoroethylene (PTFE); a rubber-based binder including a styrene-butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder such as polyvinyl alcohol; a polyolefin-based binder including polyethylene or polypropylene; a polyimide-based binder; a polyester-based binder; and a silane-based binder.

Also, the conductive agent is a material providing conductivity without causing adverse chemical changes in the battery, wherein it may be added in an amount of 1 wt % to 20 wt % based on the total weight of the solid content in the positive electrode slurry.

As a typical example of the conductive agent, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of the solid content in the positive electrode slurry including the positive electrode active material as well as optionally the binder and the conductive agent is in a range of 10 wt % to 60 wt %, for example, 20 wt % to 50 wt %.

(2) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \le x \le 1$), $Li_xWO_2$ ($0 \le x \le 1$), and $Sn_xMe_{1-x}Me'_yO_z$ (Me: manganese (Mn), Fe, Pb, or Ge; Me':Al, boron (B), phosphorus (P), Si, Groups I, II and III elements of the periodic table, or halogen; $0 \le x \le 1$; $1 \le y \le 3$; $1 \le z \le 8$) may be used as the metal composite oxide.

The material, which may be doped and undoped with lithium, may include Si, $SiO_x$ ($0<x \le 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be a fluorine resin-based binder including polyvinylidene fluoride (PVDF) or polytetrafluoroethylene (PTFE); a rubber-based binder including a styrene-butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder such as polyvinyl alcohol; a polyolefin-based binder including polyethylene or polypropylene; a polyimide-based binder; a polyester-based binder; and a silane-based binder. In this case, the binder may be the same as or different from the binder included in the positive electrode.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. In this case, the conductive agent may be the same as or different from the conductive agent included in the positive electrode.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the negative electrode slurry including the negative electrode active material as well as optionally the binder and the conductive agent is in a range of 50 wt % to 75 wt %, for example, 50 wt % to 65 wt %.

(3) Separator

A typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the lithium secondary battery of the present invention, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

After $LiPF_6$ was dissolved in 98.0 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte solution was prepared by adding 2.0 g of the compound represented by Formula 1a (see Table 1 below).

(Secondary Battery Preparation)

A positive electrode active material ($Li(Ni_{0.8}Co_{0.1}Mn_{0.1})O_2$; NCM811), carbon black as a conductive agent, and polyvinylidene fluoride, as a binder, were added to N-methyl-2-pyrrolidone (NMP), as a solvent, at a weight ratio of 97.5:1:1.5 to prepare a positive electrode slurry (solid content 50 wt %). A 15 μm thick positive electrode collector (aluminum (Al) thin film) was coated with the positive electrode slurry, dried, and then roll-pressed to prepare a positive electrode.

A negative electrode active material (graphite:SiO=95:5 weight ratio), a binder (SBR-CMC), and a conductive agent (carbon black) were added in a weight ratio of 95:3.5:1.5 to water, as a solvent, to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

The positive electrode, a porous polyolefin-based separator coated with inorganic material particles ($Al_2O_3$), and the negative electrode were sequentially stacked to prepare an electrode assembly.

After the assembled electrode assembly was accommodated in a battery case, and 6 mL of the prepared non-aqueous electrolyte solution was injected thereinto to prepare a stack cell (capacity: 2 Ah).

Example 2

A stack cell was prepared in the same manner as in Example 1 except that, after $LiPF_6$ was dissolved in 97.0 g of a non-aqueous organic solvent such that a concentration of the $LiPF_6$ was 1.0 M, a non-aqueous electrolyte solution was prepared by adding 3.0 g of the compound represented by Formula 1a (see Table 1 below).

Example 3

A stack cell was prepared in the same manner as in Example 1 except that, after $LiPF_6$ was dissolved in 95.0 g of a non-aqueous organic solvent such that a concentration of the $LiPF_6$ was 1.0 M, a non-aqueous electrolyte solution was prepared by adding 5.0 g of the compound represented by Formula 1a (see Table 1 below).

Example 4

A stack cell was prepared in the same manner as in Example 1 except that, after $LiPF_6$ was dissolved in 99.9 g of a non-aqueous organic solvent such that a concentration of the $LiPF_6$ was 1.0 M, a non-aqueous electrolyte solution was prepared by adding 0.1 g of the compound represented by Formula 1a (see Table 1 below).

Example 5

A stack cell was prepared in the same manner as in Example 1 except that, after $LiPF_6$ was dissolved in 94.0 g of a non-aqueous organic solvent such that a concentration of the $LiPF_6$ was 1.0 M, a non-aqueous electrolyte solution was prepared by adding 6.0 g of the compound represented by Formula 1a (see Table 1 below).

Comparative Example 1

A stack cell was prepared in the same manner as in Example 1 except that, after $LiPF_6$ was dissolved in 97.0 g of a non-aqueous organic solvent such that a concentration of the $LiPF_6$ was 1.0 M, a non-aqueous electrolyte solution was prepared by only adding 3.0 g of vinylene carbonate as an additive (see Table 1 below).

Comparative Example 2

A stack cell was prepared in the same manner as in Example 1 except that, after $LiPF_6$ was dissolved in 98.0 g of a non-aqueous organic solvent such that a concentration of the $LiPF_6$ was 1.0 M, a non-aqueous electrolyte solution was prepared by adding 2.0 g of the compound represented by Formula 2 below (see Table 1 below).

[Formula 2]

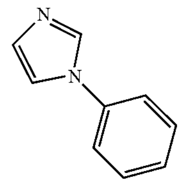

Comparative Example 3

A stack cell was prepared in the same manner as in Example 1 except that, after $LiPF_6$ was dissolved in 98.0 g of a non-aqueous organic solvent such that a concentration of the $LiPF_6$ was 1.0 M, a non-aqueous electrolyte solution was prepared by adding 2.0 g of a compound represented by Formula 3 below (see Table 1 below).

[Formula 3]

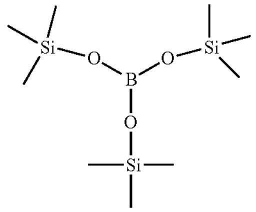

TABLE 1

| | Non-aqueous organic solvent | | Additive | |
|---|---|---|---|---|
| | Composition | Amount (g) | Type | Amount (g) |
| Example 1 | EC:EMC = | 98.0 | Formula 1a | 2.0 |
| Example 2 | 30:70 | 97.0 | Formula 1a | 3.0 |
| Example 3 | volume | 95.0 | Formula 1a | 5.0 |
| Example 4 | ratio | 99.9 | Formula 1a | 0.1 |
| Example 5 | | 94.0 | Formula 1a | 6.0 |
| Comparative Example 1 | | 97.0 | Vinylene carbonate | 3.0 |
| Comparative Example 2 | | 98.0 | Formula 2 | 2.0 |
| Comparative Example 3 | | 98.0 | Formula 3 | 2.0 |

EXPERIMENTAL EXAMPLES

Experimental Example 1. Binding Energy Evaluation

Binding energy (Example 1) of the compound represented by Formula 1a and $PF_5$, binding energy (Comparative Example 1) of the compound represented by Formula 2 and $PF_5$, and binding energy (Comparative Example 2) of the compound represented by Formula 3 and $PF_5$ were respectively calculated using a density-functional theory (DFT; Chem. Mater. 2019, 31, 11, 4025-4033), and the results thereof are illustrated in the FIGURE.

In this case, with respect to a binding energy calculation method using the density-functional theory, after measuring ① binding energy of the most stable structure when each compound and $PF_5$ were dissolved in an equivalent ratio of 1:1 in an ethylene carbonate solvent, ② energy of a stable structure when $PF_5$ was individually present in ethylene carbonate, and ③ energy of a stable structure of each compound of Formula 1a, 2, or 3 in an ethylene carbonate solvent, a binding energy value of each of the compounds and $PF_5$ may be calculated using an equation such as (①-(②+③)).

Referring to the FIGURE, with respect to the compound represented by Formula 1a, it may be understood that it had a higher binding energy with $PF_5$ than the compound represented by Formula 2 and the compound represented by Formula 3.

Referring to these results, in a case in which the compound represented by Formula 1a is used as a non-aqueous electrolyte solution additive, since it may scavenge a decomposition product generated from the lithium salt in the electrolyte solution by being effectively combined with the decomposition product, it is expected that degradation of the battery may be effectively suppressed.

Experimental Example 2. High-Temperature Storage Evaluation

After each of the lithium secondary batteries prepared in Examples 1 to 5 and the batteries prepared in Comparative Examples 1 to 3 was charged at 0.33 C rate to 4.2 V under a constant current/constant voltage condition at room temperature (25° C.) and discharged at 2.5 C rate for 10 second, initial resistance and initial discharge capacity were measured using PNE-0506 charge/discharge equipment (manufacturer: PNE solution).

Then, after charging each battery at 0.33 C rate to 4.2 V under a constant current/constant voltage condition at 45° C. and discharging each battery at 0.33 C rate to 3 V under a constant current condition were set as one cycle and 200 cycles of charging and discharging were performed, changed capacity and resistance were measured using PNE-0506 charge/discharge equipment (manufacturer: PNE solution).

Capacity retention (%) after high-temperature charge and discharge cycles and resistance increase rate (%) after high-temperature charge and discharge cycles were calculated using Equation 1 and Equation 2, respectively, and the results thereof are listed in Table 2 below.

Capacity retention (%): (discharge capacity after 200 cycles/initial discharge capacity)×100 [Equation 1]

Resistance increase rate (%){(resistance after 200 cycles-initial resistance)/initial resistance}×100 [Equation 2]

TABLE 2

| | After 200 cycles | |
|---|---|---|
| | Capacity retention (%) | Resistance increase rate (%) |
| Example 1 | 98.2 | 1.2 |
| Example 2 | 97.5 | 2.7 |
| Example 3 | 96.4 | 3.5 |
| Example 4 | 96.7 | 3.1 |
| Example 5 | 95.1 | 3.9 |
| Comparative Example 1 | 82.6 | 24.3 |
| Comparative Example 2 | 93.4 | 5.4 |
| Comparative Example 3 | 85.2 | 16.8 |

Referring to Table 2, with respect to the lithium secondary batteries of Examples 1 to 5 which included the non-aqueous electrolyte solution including the additive of the present invention, it may be understood that capacity retention and resistance increase rate after high-temperature cycles were significantly improved in comparison to those of the secondary battery of Comparative Example 1 only including vinylene carbonate as an additive, the secondary battery of Comparative Example 2 which included the non-aqueous electrolyte solution including the compound represented by Formula 2 as an additive, and the secondary battery of Comparative Example 3 which included the non-aqueous electrolyte solution including the compound represented by Formula 3 as an additive.

Referring to these results, with respect to the lithium secondary batteries of Examples 1 to 5, since an effect of scavenging the thermal decomposition product of the lithium salt and a resulting effect of strengthening durability of the SEI may be secured by introducing the compound with an excellent binding force with the Lewis acid as the electrolyte solution additive, a reaction, in which an SEI is additionally formed by an additional decomposition reaction of the electrolyte, may be suppressed, and thus, it may be confirmed that stable operation of the battery may be achieved.

With respect to the secondary battery of Example 5 in which a rather large amount of the additive was included, since ionic conductivity was reduced due to an increase in viscosity of the non-aqueous electrolyte solution and an amount of decomposition of the additive was increased, it may be confirmed that the capacity retention was relatively decreased and the resistance increase rate was relatively increased in comparison to those of the secondary batteries of Examples 1 to 4.

The invention claimed is:

1. A lithium secondary battery comprising:

a positive electrode;

a negative electrode; and a non-aqueous electrolyte solution, wherein the non-aqueous electrolyte solution comprises:

a lithium salt;

an organic solvent; and a non-aqueous electrolyte solution additive represented by Formula 1:

[Formula 1]

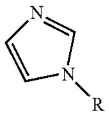

wherein

R is a cyclic alkyl group having 3 to 10 carbon atoms, wherein the non-aqueous electrolyte solution additive is present in an amount of 0.05 wt % to 6.5 wt % based on a total weight of the non-aqueous electrolyte solution, and wherein the non-aqueous electrolyte solution does not comprise a phosphate-based compound.

2. The lithium secondary battery of claim 1, wherein R is a cyclic alkyl group having 5 to 8 carbon atoms.

3. The lithium secondary battery of claim 1, wherein R is a cyclic alkyl group having 5 to 7 carbon atoms.

4. The lithium secondary battery of claim 1, wherein the non-aqueous electrolyte solution additive is represented by Formula 1a:

[Formula 1a]

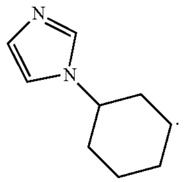

5. The lithium secondary battery of claim 1, wherein the non-aqueous electrolyte solution additive is present in an amount of 0.05 wt % to 5.5 wt % based on a total weight of the non-aqueous electrolyte solution.

6. The lithium secondary battery of claim 1, wherein the non-aqueous electrolyte solution additive is present in an amount of 0.1 wt % to 3.5 wt % based on a total weight of the non-aqueous electrolyte solution.

7. The lithium secondary battery of claim 1, wherein the non-aqueous electrolyte solution additive is present in an amount of 0.2 wt % to 2.5 wt % based on a total weight of the non-aqueous electrolyte solution.

8. The lithium secondary battery of claim 1, further comprising at least one other additive of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, or a lithium salt-based compound.

* * * * *